United States Patent
Lan et al.

(10) Patent No.: US 11,429,823 B1
(45) Date of Patent: Aug. 30, 2022

(54) SYSTEMS AND METHODS FOR DYNAMICALLY AUGMENTING MACHINE LEARNING MODELS BASED ON CONTEXTUAL FACTORS ASSOCIATED WITH EXECUTION ENVIRONMENTS

(71) Applicant: CA, INC., San Jose, CA (US)

(72) Inventors: Qichao Lan, Torrance, CA (US);
XueFeng Tian, Culver City, CA (US);
Tao Cheng, Cypress, CA (US); Rudy Senstad, Culver City, CA (US)

(73) Assignee: CA, INC., New York, NY (US)

( * ) Notice: Subject to any disclaimer, the term of this patent is extended or adjusted under 35 U.S.C. 154(b) by 1204 days.

(21) Appl. No.: 15/922,280

(22) Filed: Mar. 15, 2018

(51) Int. Cl.
  *G06K 9/62* (2022.01)
  *G06F 21/53* (2013.01)
  *G06F 21/56* (2013.01)
  *G06N 20/00* (2019.01)

(52) U.S. Cl.
  CPC ........... *G06K 9/6282* (2013.01); *G06F 21/53* (2013.01); *G06F 21/56* (2013.01); *G06K 9/6256* (2013.01); *G06N 20/00* (2019.01)

(58) Field of Classification Search
  None
  See application file for complete search history.

(56) References Cited

PUBLICATIONS

Wang S, Tuor T, Salonidis T, Leung KK, Makaya C, He T, Chan K. When edge meets learning: Adaptive control for resource-constrained distributed machine learning. InIEEE INFOCOM 2018—IEEE Conference on Computer Communications Apr. 16, 2018 (pp. 63-71). IEEE. (Year: 2018).*

Oneto L, Ghio A, Ridella S, Anguita D. Learning resource-aware classifiers for mobile devices: from regularization to energy efficiency. Neurocomputing. Dec. 2, 2015; 169:225-35. (Year: 2015).*

K. Bellman, C. Landauer, N. Dutt, L. Esterle, A. Herkersdorf, A. Jantsch, N. TaheriNejad, P. R. Lewis, M. Platzner, and K. Tammemäe. 2020. Self-aware Cyber-Physical Systems. ACM Trans. Cyber-Phys. Syst. 4, 4, Article 38 (Aug. 2020), 26 pages. DOI:https://doi.org/10.1145/3375716 (Year: 2020).*

Ye Y, Li T, Adjeroh D, Iyengar SS. A survey on malware detection using data mining techniques. ACM Computing Surveys (CSUR). Jun. 29, 2017;50(3):1-40. (Year: 2017).*

(Continued)

*Primary Examiner* — Vincent Gonzales
(74) *Attorney, Agent, or Firm* — Foley & Lardner LLP

(57) ABSTRACT

The disclosed computer-implemented method for dynamically augmenting machine learning models based on contextual factors associated with execution environments may include (1) generating a base machine learning model and a supplemental set of machine learning models, (2) determining at least one contextual factor associated with an execution environment of a machine learning system that is configured to make predictions regarding a set of input data using at least the base machine learning model, (3) selecting, based on the contextual factor, a continuation set of machine learning models from the supplemental set of machine learning models, and (4) directing the machine learning system to utilize both the base machine learning model and the continuation set of machine learning models when making predictions regarding the set of input data. Various other methods, systems, and computer-readable media are also disclosed.

20 Claims, 7 Drawing Sheets

(56) References Cited

PUBLICATIONS

Dietterich, T. G. (2000). Ensemble Methods in Machine Learning. In J. Kittier and F. Roli (Ed.) First International Workshop on Multiple Classifier Systems, Lecture Notes in Computer Science (pp. 1-15). New York: Springer Verlag; available at http://web.engr.oregonstate.edu/~tgd/publications/mcs-ensembles.pdf.

Mohammed Sunasra, Performance Metrics for Classification problems in Machine Learning, https://medium.com/greyatom/performance-metrics-for-classification-problems-in-machine-learning-part-i-b085d432082b. (Nov. 11, 2017).

Necati Demir, Ensemble Methods: Elegant Techniques to Produce Improved Machine Learning Results, https://www.toptal.com/machine-learning/ensemble-methods-machine-learning, as accessed on Mar. 15, 2018.

Wikipedia, Decision tree learning, https://en.wikipedia.org/w/index.php?title=Decision_tree_learning&oldid=829161082, as accessed on Mar. 15, 2018.

Wikipedia, Ensemble learning, https://en.wikipedia.org/w/index.php?title=Ensemble_learning&oldid=824705300, as accessed on Mar. 15, 2018.

Wikipedia, F1 score, https://en.wikipedia.org/w/index.php?title=F1_score&oldid=829249928, as accessed on Mar. 15, 2018.

Wikipedia, Random forest, https://en.wikipedia.org/w/index.php?title=Random_forest&oldid=830244793, as accessed on Mar. 15, 2018.

\* cited by examiner

SYSTEMS AND METHODS FOR DYNAMICALLY AUGMENTING MACHINE LEARNING MODELS BASED ON CONTEXTUAL FACTORS ASSOCIATED WITH EXECUTION ENVIRONMENTS

BACKGROUND

Computing devices and networks are often attacked by emerging malware threats that cannot be adequately identified and countered by common signature-based detection systems. Accordingly, machine learning models are increasingly utilized in the fight against malware. Machine-learning based detection systems often utilize multiple machine learning models (e.g., random forests, decision trees, Bayes optimal classifiers, etc.) to evaluate files for potential threats.

However, such machine learning models are often implemented across a wide range of execution environments, which may lead to inefficient modeling and/or an inefficient usage of computing resources. For example, a desktop computing system may have access to fewer computing resources (e.g., fewer processing resources, fewer memory resources, lower bandwidth resources, etc.) than a dedicated gateway server, and hence may not be able to utilize a more complicated and/or robust machine learning model capable of being executed by the dedicated gateway server. Conversely, the dedicated gateway server may have access to more computing resources than the desktop computing system, and may therefore waste those computing resources when utilizing a simpler machine learning model capable of being executed by the desktop computing system.

In order to efficiently utilize available computing resources of a variety of execution environments, a developer may have to create and/or maintain several different models (e.g., different builds, different forests, etc.) for different execution environments (e.g., computing system types, hardware configurations, software configurations, etc.). This may be difficult, costly, cumbersome, and/or inefficient. Additionally, malicious developers may be able to create malware capable of evading detection by examining and/or testing their malware against a machine learning model prepared for and/or executed by a particular execution environment.

The instant disclosure, therefore, identifies and addresses a need for systems and methods for dynamically augmenting machine learning models based on contextual factors associated with execution environments.

SUMMARY

As will be described in greater detail below, the instant disclosure describes various systems and methods for dynamically augmenting machine learning models based on contextual factors associated with execution environments.

In one example, a computer-implemented method for dynamically augmenting machine learning models based on contextual factors associated with execution environments may include generating a base machine learning model and a set of supplemental machine learning models, and determining at least one contextual factor associated with an execution environment of a machine learning system that is configured to make predictions regarding a set of input data using at least the base machine learning model. The method may further include selecting, based on the contextual factor associated with the execution environment of the machine learning system, a continuation set of machine learning models from the set of supplemental machine learning models, and directing the machine learning system to utilize both the base machine learning model and the continuation set of machine learning models when making predictions regarding the set of input data.

In at least one example, the contextual factor associated with the execution environment of the machine learning system may include at least one of (1) a performance profile associated with the execution environment, (2) processing resources of the execution environment, (3) memory resources of the execution environment, (4) bandwidth resources of the execution environment, (5) a machine type associated with the execution environment, (6) a hardware designator associated with the execution environment, and (7) a software environment of the execution environment.

In some embodiments, the base machine learning model may include a random forest that may include at least one decision tree, and the continuation set of machine learning models may include at least one additional decision tree. In at least one embodiment, directing the machine learning system to utilize both the base machine learning model and the continuation set of machine learning models when making predictions regarding the set of input data may include including the additional decision tree in the random forest when making predictions regarding the set of input data.

In at least one example, selecting the continuation set of machine learning models may include determining, based on the contextual factor, that the machine learning system is capable of making predictions regarding input data within a threshold period of time while utilizing both the base machine learning model and the continuation set of machine learning models.

In some examples, selecting the continuation set of machine learning models may include (1) identifying a prediction improvement factor associated with a machine learning model included in the set of supplemental machine learning models, (2) determining that the prediction improvement factor associated with the machine learning model is greater than a predetermined prediction improvement threshold, and (3) including the machine learning model in the continuation set of machine learning models.

In some embodiments, selecting the continuation set of machine learning models may include (1) selecting at least one decision tree from a set of decision trees included in the set of supplemental machine learning models, and (2) designating the decision tree as at least part of the continuation set of machine learning models.

In at least one embodiment, generating the base machine learning model and the set of supplemental machine learning models may include (1) identifying a base set of attributes included in a set of training data and a supplemental set of attributes included in the set of training data, (2) generating the base machine learning model based on the base set of attributes included in the set of training data, (3) generating at least one supplemental machine learning model based on the supplemental set of attributes included in the set of training data, and (4) including the supplemental machine learning model in the set of supplemental machine learning models.

In at least one example, generating the base machine learning model may include generating a random forest based on the set of training data and the base set of attributes, and generating the supplemental machine learning model may include (1) generating a supplemental decision tree based on the set of training data and at least one attribute included in the supplemental set of attributes, and (2) including the supplemental decision tree in the supplemental machine learning model. In some examples, selecting the continuation set of machine learning models from the set of supplemental machine learning models may include selecting the supplemental machine learning model. In at least one embodiment, directing the machine learning system to utilize both the base machine learning model and the continuation set of machine learning models when making predictions regarding the set of input data may include including the supplemental decision tree in the random forest when making predictions regarding the set of input data.

In at least one example, the machine learning system may be further configured to utilize both the base machine learning model and the continuation set of machine learning models to make predictions regarding whether data corresponds to malware properties, and the set of input data may correspond to malware properties.

In some embodiments, the computer-implemented method may further include predicting, using the machine learning system, that malware is present on a source computing system. In one or more embodiments, the computer-implemented method may further include performing a security action to protect the source computing device from malware predicted to be present on the source computing device. In some examples, the security action may include at least one of (1) notifying an administrator of the source computing device that malware may be present on the source computing device, (2) preventing a user from accessing the malware, (3) quarantining the malware within a secure storage location, (4) preventing the source computing device from transmitting the malware to another computing device, and (5) preventing the source computing device from transmitting the malware to another computing device by shutting down the source computing device.

In addition, a corresponding system for dynamically augmenting machine learning models based on contextual factors associated with execution environments may include several modules stored in memory, including a generation module that generates a base machine learning model and a set of supplemental machine learning models, and a determination module that determines at least one contextual factor associated with an execution environment of a machine learning system that is configured to make predictions regarding a set of input data using at least the base machine learning model. The system may further include a selection module that selects, based on the contextual factor associated with the execution environment of the machine learning system, a continuation set of machine learning models from the set of supplemental machine learning models, and a direction module that directs the machine learning system to utilize both the base machine learning model and the continuation set of machine learning models when making predictions regarding the set of input data. The system may also include at least one physical processor that executes the generation module, the determination module, the selection module, and the direction module.

In some examples, the contextual factor associated with the execution environment of the machine learning system may include at least one of (1) a performance profile associated with the execution environment, (2) processing resources of the execution environment, (3) memory resources of the execution environment, (4) bandwidth resources of the execution environment, (5) a machine type associated with the execution environment, (6) a hardware designator associated with the execution environment, and (7) a software environment of the execution environment.

In some embodiments, the base machine learning model may include a random forest that may include at least one decision tree, and the continuation set of machine learning models may include at least one additional decision tree. In at least one embodiment, the direction module may direct the machine learning system to utilize both the base machine learning model and the continuation set of machine learning models when making predictions regarding the set of input data by including the additional decision tree in the random forest when making predictions regarding the set of input data.

In at least one example, the selection module may select the continuation set of machine learning models by determining, based on the contextual factor, that the machine learning system is capable of making predictions regarding input data within a threshold period of time while utilizing both the base machine learning model and the continuation set of machine learning models.

In some embodiments, the selection module may select the continuation set of machine learning models by (1) selecting at least one decision tree from a set of pre-generated decision trees, and (2) designating the decision tree as at least part of the continuation set of machine learning models.

In at least one example, the machine learning system may be further configured to utilize both the base machine learning model and the continuation set of machine learning models to make predictions regarding whether data corresponds to malware properties, and the set of input data may correspond to malware properties In some examples, the above-described method may be encoded as computer-readable instructions on a computer-readable medium. For example, a computer-readable medium may include one or more computer-executable instructions that, when executed by at least one processor of a computing device, may cause the computing device to generate, based on a set of training data, a base machine learning model and a supplemental set of machine learning models, and determine at least one contextual factor associated with an execution environment of a machine learning system that is configured to make predictions regarding a set of input data using at least the base machine learning model. The computer-readable medium may further include one or more computer-executable instructions that, when executed by the processor of the computing device, may cause the computing device to select, based on the contextual factor associated with the execution environment of the machine learning system, a continuation set of machine learning models from the supplemental set of machine learning models, and direct the machine learning system to utilize both the base machine learning model and the continuation set of machine learning models when making predictions regarding the set of input data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
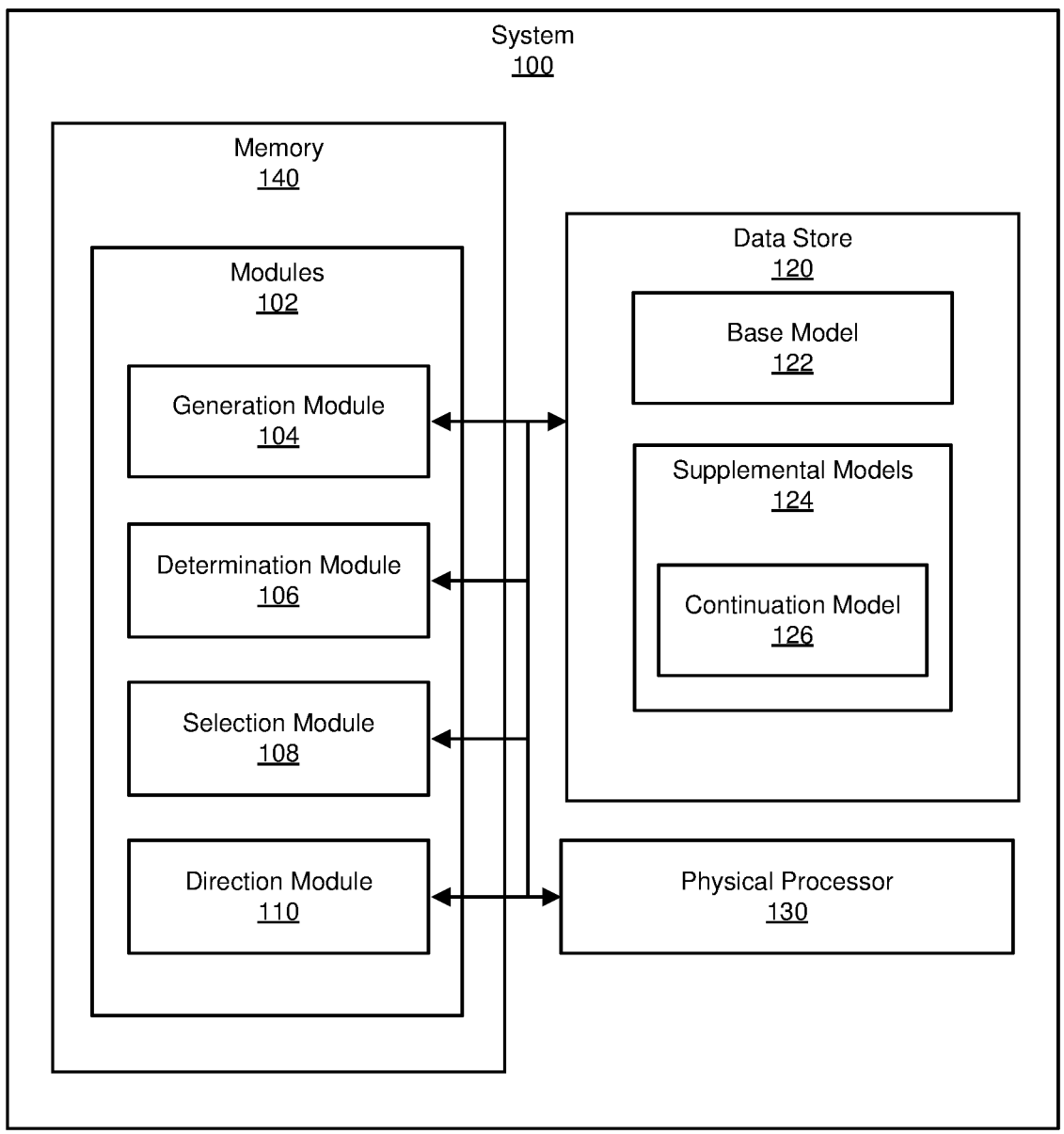
FIG. 1 is a block diagram of an example system for dynamically augmenting machine learning models based on contextual factors associated with execution environments.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for dynamically augmenting machine learning models based on contextual factors associated with execution environments. As will be explained in greater detail below, embodiments of the instant disclosure may generate a base machine learning model and a set of supplemental machine learning models. An embodiment may then determine a contextual factor associated with an execution environment of a machine learning system, such as a performance profile associated with the execution environment, processing resources of the execution environment, memory resources of the execution environment, and so forth. The embodiment may then select, based on the contextual factor, a continuation set of machine learning models from the set of supplemental machine learning models, such as an additional set of decision trees to add to (e.g., incorporate into, create an ensemble model including, etc.) a random forest of the base machine learning model. The embodiment may then direct the machine learning model to utilize both the base machine learning model and the continuation set of machine learning models when making predictions (e.g., classifications) regarding the set of input data (e.g., data associated with potential computer security threats).

By selecting a continuation set of machine learning models based on a contextual factor (e.g., a performance factor, a computing resource, etc.) of an execution environment of a machine learning system, embodiments of the systems and methods described herein may effectively customize a machine learning model (e.g., augment a base machine learning model with a continuation set of machine learning models) for a specific execution environment. This may result in an efficient utilization of machine resources of individual computing systems, as well increase the robustness of machine learning models implemented by individual computing systems. The systems and methods described herein may therefore maximize malware detection capabilities of individual computing systems. Additionally, the systems and methods described herein may also individualize machine learning models utilized by each computing system, thereby minimizing the ability of malicious developers to design malware to evade specific machine learning models implemented by known execution environments.

The following will provide, with reference to FIGS. 1-2 and 4-5, detailed descriptions of systems for dynamically augmenting machine learning models based on contextual factors associated with execution environments. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 6 and 7, respectively.

FIG. 1 is a block diagram of an example system 100 for dynamically augmenting machine learning models based on contextual factors associated with execution environments. As illustrated in this figure, example system 100 may include one or more modules 102 for performing one or more tasks. As will be explained in greater detail below, modules 102 may include a generation module 104 that generates a base machine learning model and a set of supplemental machine learning models, and a determination module 106 that determines at least one contextual factor associated with an execution environment of a machine learning system that is configured to make predictions regarding a set of input data using at least the base machine learning model.

Example system 100 may further include a selection module 108 that selects, based on the contextual factor associated with the execution environment of the machine learning system, a continuation set of machine learning models from the set of supplemental machine learning models, and a direction module 110 that directs the machine learning system to utilize both the base machine learning model and the continuation set of machine learning models when making predictions regarding the set of input data.

As also illustrated in FIG. 1, example system 100 may also include one or more data stores, such as data store 120. In at least one example, data store 120 may include base machine learning model 122 (also referred to herein as "base model 122"), which may include information associated with at least one machine learning model. In some examples, data store 120 may further include one or more supplemental machine learning models 124 (also referred to herein as "supplemental models 124"), which may also include information associated with at least one machine learning model. As further shown in FIG. 1, supplemental models 124 may include at least one continuation machine learning model 126 (also referred to herein as "continuation model 126"), which may also include information associated with at least one machine learning model.

Data store 120 may represent portions of a single data store or computing device or a plurality of data stores or computing devices. In some embodiments, data store 120 may be a logical container for data and may be implemented in various forms (e.g., a file, a data structure, a database, etc.). Data store 120 may include, without limitation, a data object, a file, a collection of files, a file system, and/or one or more databases. In some examples, data store 120 may include one or more database management system such as a relational database, an operational data store (ODS), a NoSQL database, a NewSQL database, and/or any other suitable organized collection of data.

The term "machine learning model," as used herein, may generally refer to any supervised, unsupervised, deep learning, or other machine learning technique for classification and/or sorting of file data. Examples of machine learning models may include, without limitation, decision trees, random forests, artificial neural networks, Bayesian networks, and so forth.

A machine learning model may include a single machine learning model or a plurality or "ensemble" of machine learning models that are each trained independently using a common set of data. Once a machine learning model is trained (e.g., using training data), input data, such as file data, may be run through each of the models and the output may be used to classify and/or sort the input data. For example, a "forest" or "random forest" model may include a plurality of decision trees that are each trained independently using a common set of training data. The trained forest model may be used by a security service to classify files and identify potentially malicious files. In some embodiments, individual files may each be run through a plurality of models (e.g., a plurality of trees, a plurality of forests, a combination of different models, etc.) in order to determine whether the files are safe or malicious.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate for dynamically augmenting machine learning models based on contextual factors associated with execution environments. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As further illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Figure 2:
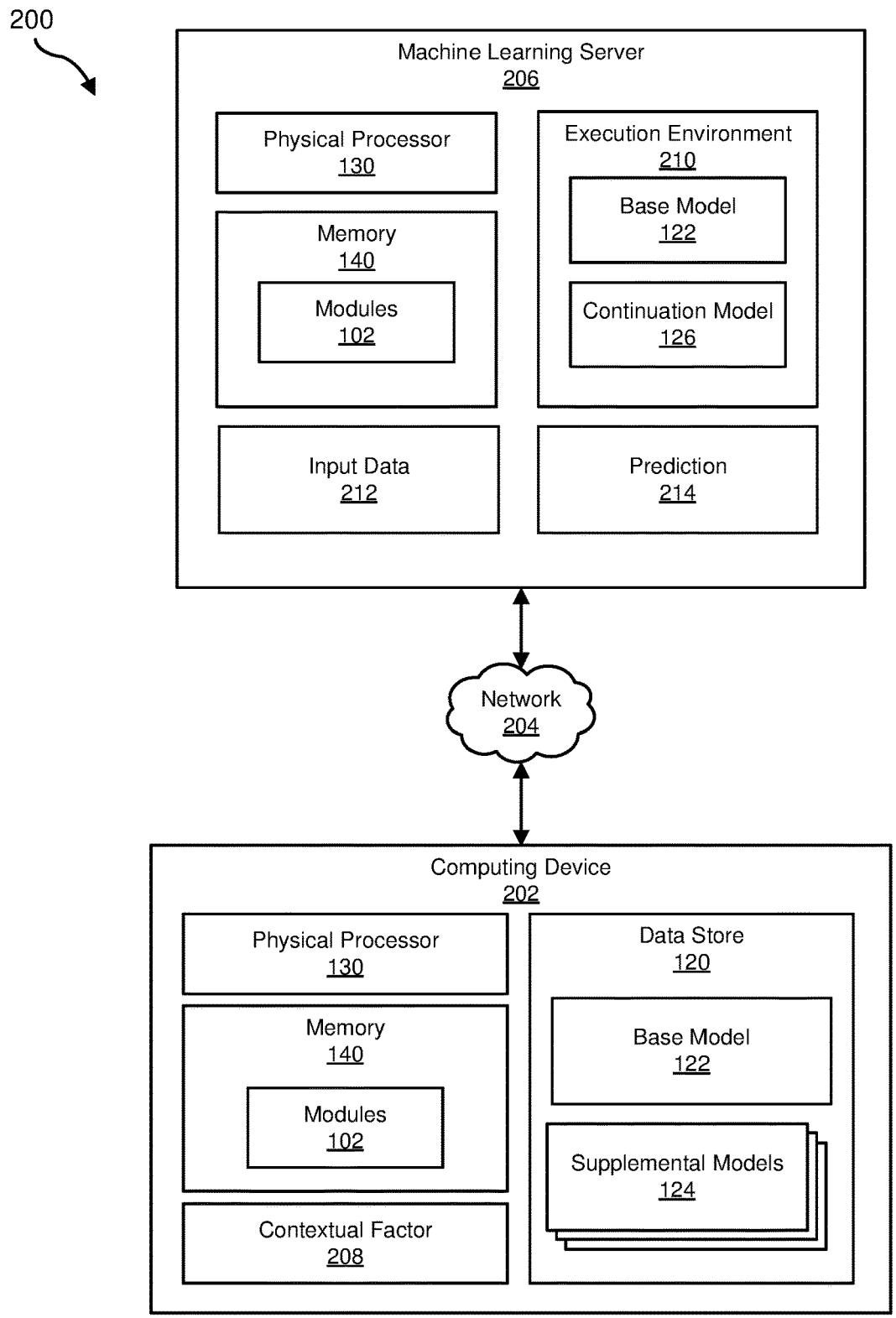
FIG. 2 is a block diagram of an additional example system for dynamically augmenting machine learning models based on contextual factors associated with execution environments.

Example system 100 in FIG. 1 may be implemented in a variety of ways. For example, all or a portion of example system 100 may represent portions of an example system 200 ("system 200") in FIG. 2. As shown in FIG. 2, system 200 may include a computing device 202 in communication with machine learning server 206 ("server 206") via network 204. In at least one example, computing device 202 may be programmed with one or more of modules 102. Additionally or alternatively, server 206 may be programmed with one or more of modules 102.

In at least one embodiment, one or more modules 102 from FIG. 1 may, when executed by computing device 202 and/or server 206, enable computing device 202 and/or server 206 to perform one or more operations to dynamically augment machine learning models based on contextual factors associated with execution environments.

For example, as will be described in greater detail below, generation module 104 may cause computing device 202 and/or server 206 to generate a base machine learning model (e.g., base model 122) and a supplemental set of machine learning models (e.g., supplemental models 124). In some examples, determination module 106 may cause computing device 202 and/or server 206 to determine at least one contextual factor (e.g., contextual factor 208) associated with an execution environment (e.g., execution environment 210) of a machine learning system (e.g., server 206) that is configured to make predictions regarding a set of input data (e.g., input data 212) using at least the base machine learning model (e.g., base model 122).

In additional examples, selection module 108 may cause computing device 202 and/or server 206 to select, based on the contextual factor associated with the execution environment of the machine learning system, a continuation set of machine learning models (e.g., continuation model 126) from the supplemental set of machine learning models. In further examples, direction module 110 may cause computing device 202 and/or server 206 to direct the machine learning system (e.g., server 206) to utilize both the base machine learning model (e.g., base model 122) and the continuation set of machine learning models (e.g., continuation model 126) when making predictions regarding the set of input data (e.g., input data 212).

In at least one embodiment, the base machine learning model (e.g., base model 122) may include a random forest model that may include at least one decision tree, and the continuation set of machine learning models (e.g., continuation model 126) may include at least one additional decision tree. In some embodiments, direction module 110 may cause computing device 202 and/or server 206 to direct the machine learning system to utilize both the base machine learning model (e.g., base model 122) and the continuation set of machine learning models (e.g., continuation model 126) when making predictions regarding the set of input data by including the additional decision tree in the random forest when making predictions regarding the set of input data.

In some examples, selection module 108 may cause computing device 202 and/or server 206 to select the continuation set of machine learning models (e.g., continuation model 126) by determining, based on the contextual factor (e.g., contextual factor 208), that the machine learning system is capable of making predictions regarding input data within a threshold period of time while utilizing both the base machine learning model and the continuation set of machine learning models. In some embodiments, selection module 108 may cause computing device 202 and/or server 206 to select the continuation set of machine learning models (e.g., continuation model 126) by selecting at least one decision tree from a set of pre-generated decision trees, and designating the decision tree as at least part of the continuation set of machine learning models.

In at least some embodiments, the machine learning system (e.g., server 206) may be further configured to utilize both the base machine learning model (e.g., base model 122) and the continuation set of machine learning models (e.g., continuation model 126) to make predictions regarding whether data corresponds to malware properties. In some examples, the set of input data (e.g., input data 212) may include data that corresponds to malware properties, and/or may be associated with data present on (e.g., accessible to) a source computing device. In some additional examples, server 206 may be utilized to predict (e.g., prediction 214) that malware is present on the source computing device. In still further examples, one or more of the systems described herein may perform a security action to protect the source computing device from malware predicted to be present on the source computing device.

Computing device 202 generally represents any type or form of computing device capable of reading and/or executing computer-executable instructions. In at least one embodiment, computing device 202 may accept one or more directions from server 206. Examples of computing device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between computing device 202 and/or server 206. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, and the like. Network 204 may facilitate communication or data transfer using wireless or wired connections. In one embodiment, network 204 may facilitate communication between computing device 202 and server 206.

Server 206 generally represents any type or form of computing device capable of reading and/or executing computer-executable instructions and/or hosting executables. In at least one example, server 206 may be a machine learning system that is configured to utilize a base machine learning model and a continuation set of machine learning models to make predictions regarding whether data indicates a potential security threat. Additional examples of server 206 may include, without limitation, application servers, storage servers, database servers, web servers, and/or any other suitable computing device configured to run certain software applications and/or provide various application, storage, and/or database services.

In at least one example, computing device 202 and server 206 may be computing devices programmed with one or more of modules 102. All or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206 may enable computing device 202 and/or server 206 to dynamically augment machine learning models based on contextual factors associated with execution environments.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
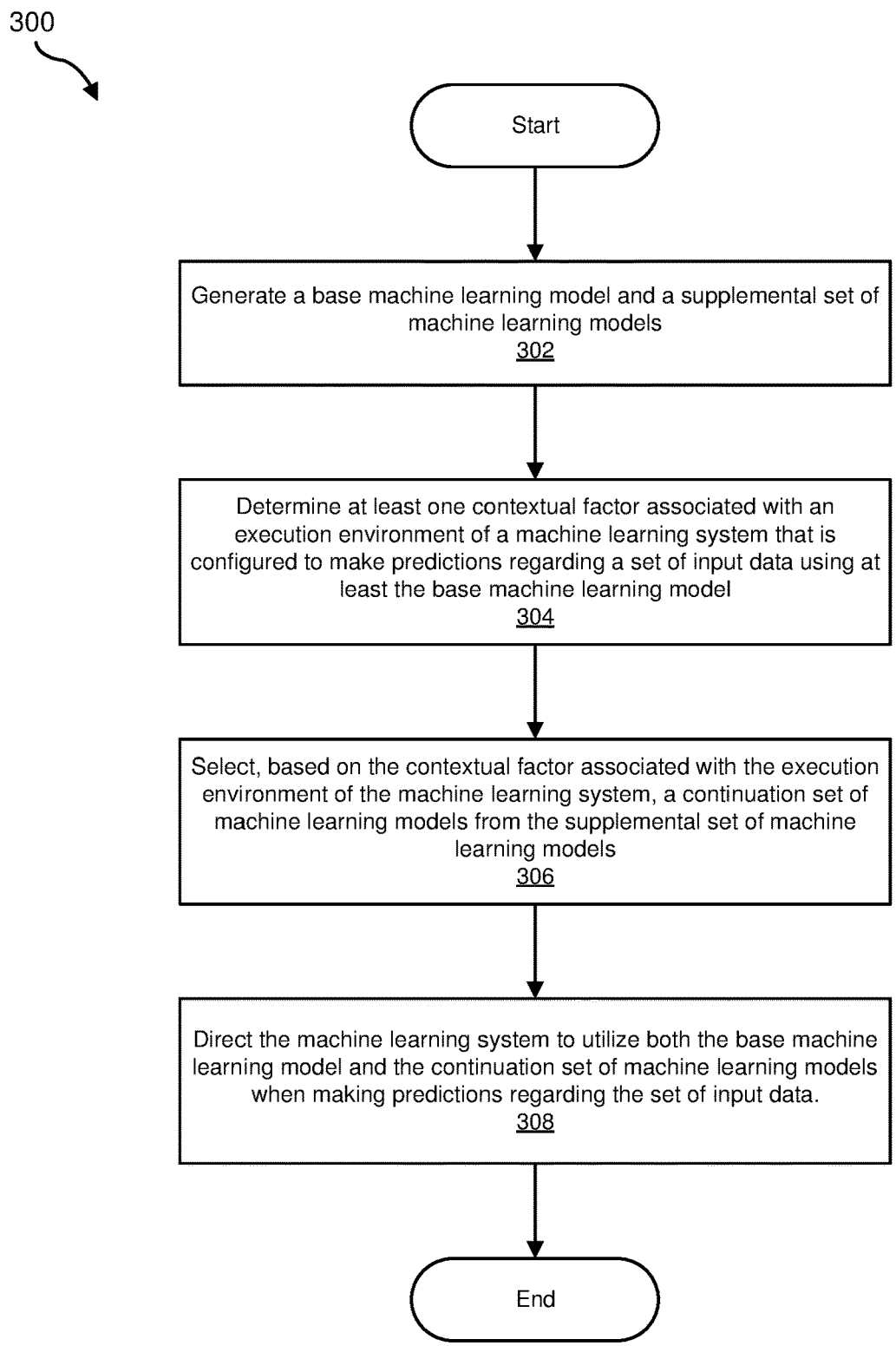
FIG. 3 is a flow diagram of an example method for dynamically augmenting machine learning models based on contextual factors associated with execution environments.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may generate a base machine learning model and a supplemental set of machine learning models. For example, generation module 104 may, as part of computing device 202 and/or server 206, generate base model 122 and supplemental models 124.

Generation module 104 may generate base model 122 and supplemental models 124 in a variety of contexts. For example, one or more of computing device 202 and/or server 206 may compile training data, including file data, that may be representative of data that is encountered, or likely to be encountered, by computing devices used by various users and/or organizations. The set of training data used to generate base model 122 and/or supplemental models 124 may include a sample of known files existing on computing device 202, server 206, and/or in the field on various computing devices, including computing devices that are supported by computing device 202 and/or server 206. The data may be categorized to identify whether the data is related to potentially malicious data, such as malware files, or to clean data that is free from malware. For example, data related to malware files may be categorized as malware data and data related to clean files may be categorized as clean data. The data may be categorized by computing device 202, server 206, and/or by at least one other computing device.

In some embodiments, categorized training data may be used to build and/or to train one or more machine learning models, such as base model 122 and/or one or more of supplemental models 124. For example, computing device 202 may use a portion of the categorized training data to build a forest model, a Bayesian network, an artificial neural network, and so forth, and may designate the machine learning model as base model 122 and/or one of supplemental models 124. Each machine learning model may be built using supervised learning techniques to create a plurality of different machine learning models. For example, trees, each having different root, branch, and leaf nodes based on the categorized data used during the building process. Base model 122 may then be utilized by malware detection programs or applications to identify malware present on a computing device, and one or more of supplemental models 124 may be utilized to augment base model 122.

As use herein, "malware" refers to software programs designed to damage a computer system and/or to cause the computer system to perform unwanted actions. Common examples of malware may include, without limitation, viruses, worms, trojan horses, spyware, and/or any other harmful program or file.

In some examples, generation module 104 may generate base model 122 and supplemental models 124 by identifying a base set of attributes included in a set of training data and a supplemental set of attributes included in the set of training data. As used herein, an "attribute" may include any quantitative or categorical feature, attribute, property, or variable that may be used in generating a machine learning model. Some attributes that may be included in input data associated with potential computer security threats (e.g., potential malware) may include, without limitation, a hash of a file, a calculated entropy score associated with a file, contents of a portion of a file, a signature of a file, a source of a file, and so forth.

Generation module 104 may then generate base model 122 based on the base set of attributes included in the set of training data (e.g., a hash of a file, a calculated entropy score associated with the file, etc.), and may generate a supplemental machine learning model based on the supplemental set of attributes included in the set of training data (e.g., contents of a portion of the file, etc.). Generation module 104 may then include the supplemental machine learning model in supplemental models 124.

For example, generation module 104 may generate base model 122 by generating a random forest based on the set of training data and the base set of attributes, and may generate a supplemental decision tree model included in supplemental models 124 based on the supplemental set of attributes included in the set of training data.

Figure 4:
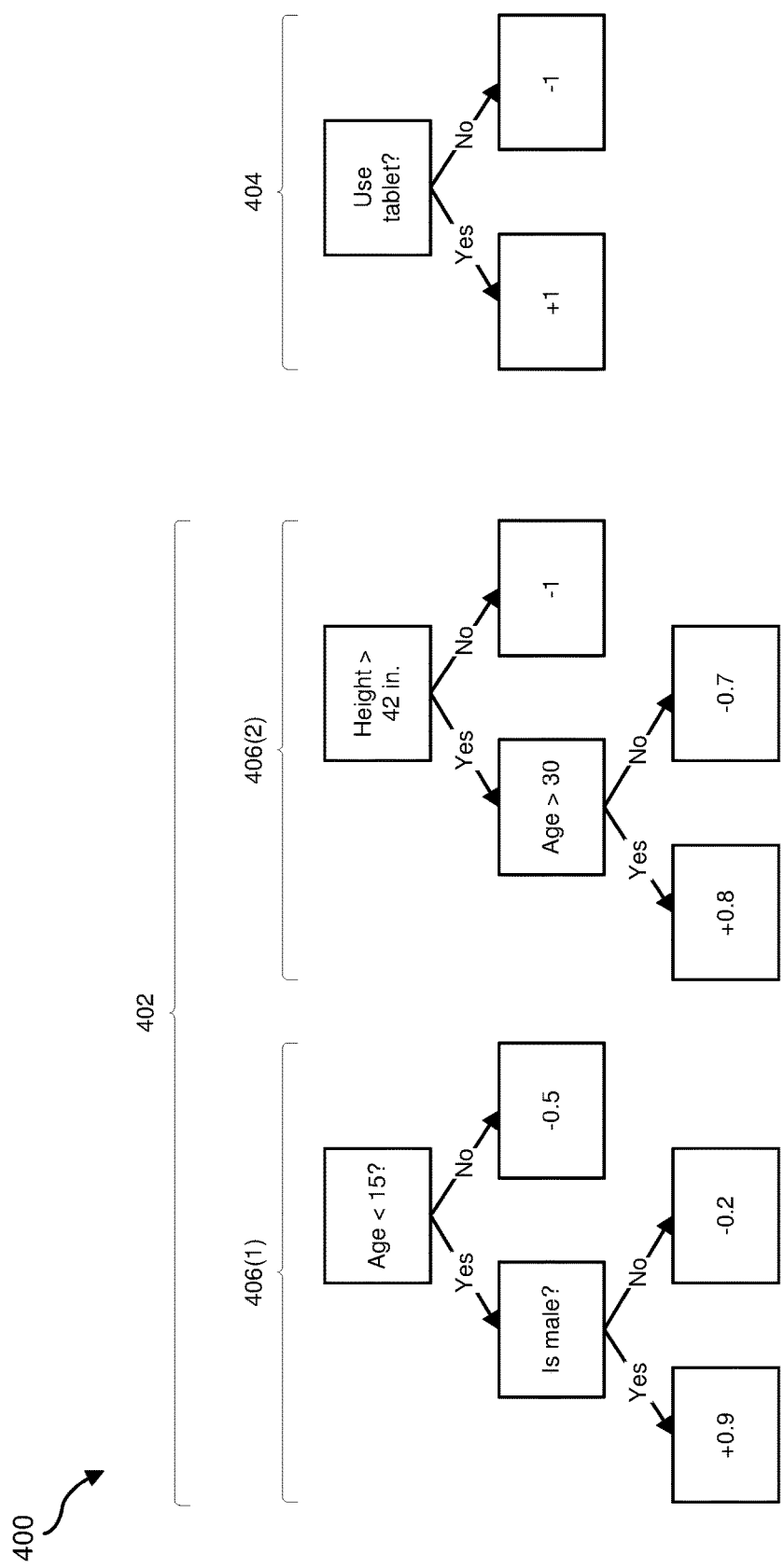
FIG. 4 is an illustration of an example base forest machine learning model and an example continuation decision tree machine learning model in accordance with principles described herein.

By way of illustration, FIG. 4 shows a view 400 that includes a random forest 402 and a supplemental decision tree 404. View 400 may show machine learning models that generation module 104 may generate based on a set of input data associated with persons and labeled and/or categorized according to the following attributes: (1) whether the person's age is less 15 years, (2) whether the person is male, (3) whether the person's height is greater than 42 inches, and (4) whether the person uses a tablet computer.

In this example, generation module 104 may generate random forest 402 that includes decision trees 406 (e.g., decision tree 406(1) and decision tree 406(2)) based on the first three attributes, and may generate supplemental decision tree 404 based on the fourth attribute. This may be because the first three attributes are particularly predictive of persons with a desired unknown attribute (e.g., whether the person is interested in video games, whether the person has children, whether the person may be interested in a particular product, etc.), whereas the last attribute (whether the person uses a tablet computer) may have less predictive value in relation to the desired unknown attribute. Hence, generation module 104 may generate and/or designate random forest 402 as base model 122 to achieve a desired level of prediction capability. However, in scenarios where a machine learning system has sufficient and/or surplus computing resources available, it may be desirable to include supplemental decision tree 404 within and/or along with random forest 402 to increase the predictive capabilities of the machine learning system. Hence, as will be described in greater detail below, one or more of modules 102 (e.g., selection module 108, direction module 110, etc.) may select supplemental decision tree 404 as a continuation set of machine learning models (e.g., continuation model 126), and direct a machine learning system to utilize both random forest 402 and supplemental decision tree 404 when making predictions regarding a set of input data.

In some embodiments, generation module 104 may additionally or alternatively generate base model 122 and supplemental models 124 by selecting, from a set of training data, a base set of training data and a supplemental set of training data. Generation module 104 may then generate base model 122 based on the base set of training data. Likewise, generation module may also select a portion of the supplemental training data, and may generate at least one supplemental machine learning model based on the selected portion of the supplemental set of training data. Generation module 104 may then include the supplemental machine learning model in supplemental models 124. In at least some examples, generation module 104 may select the base set of training data, the supplemental set of training data, and/or the portion of the supplemental training data in accordance with any suitable random or pseudo-random selection technique.

In some examples, generation module 104 may also, for each supplemental machine learning model in the set of supplemental machine learning models (e.g., supplemental models 124), determine a prediction improvement factor that may be associated with the supplemental machine learning model. As used herein, a "prediction improvement factor" may be any factor that may be associated with a machine learning model that relates to a degree of improvement in predictive ability of a base machine learning model when combined with the machine learning model. Such a factor may be based on any suitable metric associated with a machine learning model including, without limitation, a confusion matrix, an accuracy of the model (e.g., a ratio of a number of correct predictions made by the model and all predictions made), a precision of the model (e.g., a ratio of true positive predictions and a total of true positive predictions and false positive predictions), a recall value of the model (e.g., a ratio of true positive predictions and a total of true positive predictions and false negative predictions), a specificity of the model (e.g., a ratio of true negative predictions and a total of true negative predictions and false positive predictions), an F1 score of the model (e.g., a harmonic average of a precision value and a recall value), and so forth.

For example, generation module 104 may determine that a supplemental machine learning model may, when utilized along with base model 122, increase the confidence of predictions of the machine learning system by a quantifiable prediction improvement factor, such as 1 percent, 2 percent, 5 percent, 10 percent, and so forth. Generation module 104 may then associate (e.g., assign, correlate, etc.) this prediction improvement factor with the supplemental machine learning model. As will be described in greater detail below, in some embodiments, one or more of modules 102 (e.g., selection module 108) may base a selection of the supplemental machine learning model on a prediction improvement factor associated with a supplemental machine learning model included in supplemental models 124.

Additionally, in at least some embodiments, generation module 104 may, for each supplemental machine learning model in the set of supplemental machine learning models (e.g., supplemental models 124), determine a cost factor associated with the supplemental machine learning model. As will be described in greater detail below, such cost factors may indicate whether a machine learning system may be capable of efficiently making predictions regarding input data (e.g., within a threshold period of time) while utilizing both base model 122 and the supplemental machine learning model associated with the cost factor.

For example, generation module 104 may determine that, in order for an execution environment to be suitable to utilize both base model 122 and a selected supplemental machine learning model included in supplemental models 124, the execution environment must include a particular contextual factor, such as a machine type associated with the execution environment, a predetermined amount of processing resources, a software environment of the execution environment, and so forth. Generation module 104 may then associate (e.g., assign, correlate, etc.) a corresponding cost factor (e.g., a cost factor that indicates the particular contextual factor) with the supplemental machine learning model. As will be described in greater detail below, in some embodiments, one or more of modules 102 (e.g., selection module 108) may base a selection of the supplemental machine learning model on the cost factor associated with the machine learning model.

Returning to FIG. 3, at step 304, one or more of the systems described herein may determine at least one contextual factor associated with an execution environment of a machine learning system that is configured to make predictions regarding a set of input data using at least the base machine learning model. For example, determination module 106 may, as part of computing device 202 or server 206 in FIG. 2, determine contextual factor 208 associated with execution environment 210 of server 206 that is configured to make predictions regarding input data 212 using at least base model 122.

As used herein, an "execution environment" may include any hardware or software associated with a system that is configured to utilize at least one machine learning model to make predictions regarding a set of input data (e.g., input data 212). Additionally, as used herein, a "contextual factor" may be any hardware or software factor associated with an execution environment of a machine learning system including, without limitation, (1) a performance profile associated with the execution environment, (2) processing resources of the execution environment, (3) memory resources of the execution environment, (4) bandwidth resources of the execution environment, (5) a machine type associated with the execution environment, (6) a hardware designator associated with the execution environment, (7) a software environment of the execution environment, and so forth.

Determination module 106 may determine contextual factor 208 in a variety of contexts. By way of example, execution environment 210 may store data associated with contextual factor 208 in any suitable data storage location (e.g., within data store 120, memory 140, etc.), and determination module 106 may access contextual factor 208 from the suitable data storage location. Additionally, in some examples, determination module 106 may direct server 206 to execute any suitable benchmarking utility and/or protocol to determine contextual factor 208.

As an illustration, contextual factor 208 may include information representative of a machine type associated with execution environment 210 (e.g., a machine type associated with server 206). Server 206 may store contextual factor 208 in data store 120 and/or memory 140. Determination module 106 may therefore determine contextual factor 208 by accessing the information representative of the machine type stored by server 206.

In some examples, determination module 106 may determine contextual factor 208 by directing server 206 to execute one or more benchmarking utilities and/or that may be configured to determine contextual factor 208 via one or more benchmarking operations. For example, determination module 106 may direct server 206 to execute a benchmarking utility that may be configured to determine a performance profile associated with execution environment 210. The benchmarking utility may execute one or more benchmarking operations, such as a processing resource benchmarking operation, a memory resource benchmarking operation, a bandwidth resource benchmarking operation, and so forth. Determination module 106 may determine contextual factor 208 based on the results of the executed benchmarking operations, and/or may compile a performance profile associated with the execution environment that may include information representative of at least one contextual factor 208 (e.g., processing resources of the execution environment, memory resources of the execution environment, etc.).

By determining contextual factor 208 associated with execution environment 210, embodiments of the systems and methods described herein may determine computing resources available to execution environment 210. The systems and methods described herein may then utilize this contextual factor to select a continuation model 126—a set of supplemental machine learning models potentially unique to a particular execution environment 210—to augment base model 122. Thus, embodiments of the systems and methods described herein may enable efficient utilization of computing resources available to execution environment 210, and thereby enable server 206 to make improved predictions regarding input data 212.

Returning to FIG. 3, at step 306, one or more of the systems described herein may select, based on the contextual factor associated with the execution environment of the machine learning system, a continuation set of machine learning models from the supplemental set of machine learning models. For example, selection module 108 may, as part of computing device 202 and/or server 206, select, based on contextual factor 208 associated with execution environment 210 of server 206, continuation model 126 from supplemental models 124.

As used herein, a "continuation model" or "continuation set of machine learning models" may be any machine learning model or set of machine learning models that may be used in conjunction with a base machine learning model (e.g., base model 122) to make and/or improve predictions regarding a set of input data (e.g., input data 212). By way of illustration, returning to FIG. 4, supplemental decision tree 404 may be a continuation model that may be used in conjunction with random forest 402 to make decisions regarding input data as described above. Utilizing a continuation set of machine learning models along with a base machine learning model may improve the prediction and/or categorization abilities of the base machine learning model, and hence the continuation set of machine learning models may be said to augment the base machine learning model.

Selection module 108 may select continuation model 126 based on contextual factor 208 associated with execution environment 210 of server 206 in a variety of contexts. For example, selection module 108 may select continuation model 126 by selecting at least one decision tree from a set of decision trees (e.g., a set of decision trees included in supplemental models 124), and designating the decision tree as at least part of the continuation set of machine learning models. For example, returning to FIG. 4, generation module 104 may generate random forest 402 and designate random forest 402 as base model 122. Generation module 104 may also generate supplemental decision tree 404 and include it in supplemental models 124. Selection module 108 may then select supplemental decision tree 404 from supplemental models 124, and designate supplemental decision tree 404 as at least part of continuation model 126.

In some examples, selection module 108 may select continuation model 126 based on contextual factor 208 by determining, based on contextual factor 208, that the machine learning system is capable of making predictions regarding the input data within a threshold period of time while utilizing both base model 122 and continuation model 126. For example, as described above, generation module 104 may determine a cost factor associated with each machine learning model (e.g., each machine learning model in supplemental models 124) that may indicate one or more contextual factors that may be included within execution environment 210 and that may indicate that execution environment 210 is capable of utilizing the supplemental machine learning model along with base model 122 to make predictions within the threshold period of time. Such cost factors may include contextual factors including, without limitation, a machine type associated with the execution environment, a performance profile associated with the execution environment, and so forth.

The threshold period of time may be any suitable period of time within which a machine learning system (e.g., server 206) may make predictions regarding input data after being provided with the input data and after being directed to make such predictions, such as 1 ms, 10 ms, 100 ms, 1 second, 10 seconds, 1 minute, and so forth. In some examples, the threshold period of time may be determined (e.g., by one or more of modules 102) based on any suitable factor including, without limitation, a desired responsiveness of the machine learning system, a set of user-provided criteria, one or more contextual factors (e.g., contextual factor 208), and so forth.

As described above, such cost factors may indicate contextual factors that may be included in an execution environment of a machine learning system in order for the machine learning system to utilize the supplemental machine learning model along with a base machine learning model. For example, execution environment 210 may be associated with contextual factor 208 that indicates that server 206 is capable of executing N instructions per second. Base model 122 may have an associated cost factor that indicates that it may be executed by a machine learning system capable of executing M instructions per second in order to make predictions regarding input data 212 within a threshold period of time (e.g., 1 ms, 10 ms, 100 ms, 1 second, 10 seconds, etc.). Selection module 108 may determine that M is less than N, and a difference between N and M is X instructions per second. Selection module 108 may then determine, based on contextual factor 208 and the cost factor associated with base model 122, that server 206 has a surplus of processing resources. Selection module 108 may then select continuation model 126 by identifying a set of supplemental machine learning models with associated cost factors that indicate that they may be executed by a machine learning system capable of executing at least X instructions per second in order to make predictions regarding input data 212 within the threshold period of time. Hence, the processing resources of server 206 may be fully utilized while the predictive capabilities of server 206 may be fully optimized.

As an additional example, execution environment 210 may be associated with a contextual factor 208 that indicates that server 206 may be a particular machine type (e.g., a desktop computer, a gateway server, etc.). Based on contextual factor 208, selection module 108 may select, as continuation model 126 from supplemental models 124, a set of machine learning models with cost factors that indicate that machines of the particular machine type of server 206 may be capable of making predictions regarding input data 212 within a threshold period of time while utilizing both base model 122 and the selected set of machine learning models.

In some additional embodiments, selection module 108 may base a selection of continuation model 126 on any other suitable factor associated with a machine learning model. For example, as described above, in some contexts, generation module 104 may determine a prediction improvement factor for each supplemental machine learning model in supplemental models 124, and may associate the determined prediction improvement factor with the respective supplemental machine learning model. Then, selection module 108 may identify a prediction improvement factor associated with a machine learning model included in the set of supplemental machine learning models, determine that the prediction improvement factor associated with the machine learning model is greater than a predetermined prediction improvement threshold (e.g., 1 percent, 5 percent, 10 percent, etc.), and include the machine learning model in continuation model 126.

For example, returning to FIG. 4, supplemental decision tree 404 may have an associated prediction improvement factor of 4 percent, which may indicate that, when supplemental decision tree 404 is utilized as continuation model 126 with random forest 402 as base model 122, the confidence of a prediction by server 206 regarding input data 212 may increase from 75 percent to 79 percent. This associated prediction improvement factor may be greater than a predetermined prediction improvement threshold of 3 percent. Selection module 108 may identify supplemental decision tree 404 based on the associated prediction improvement factor of 4 percent being greater than the predetermined prediction improvement threshold of 3 percent, and therefore may include supplemental decision tree 404 in continuation model 126.

Additionally, in some examples, selection module 108 may also select a supplemental machine learning model from supplemental models 124 based on an attribute of the supplemental machine learning model. As described above, generation module 104 may generate base model 122 based on a base set of attributes included in a set of training data, and may generate supplemental models 124 based on a supplemental set of attributes included in the set of training data. Each supplemental machine learning model may therefore be generated based on a set of attributes included in the supplemental set of attributes. For example, a first supplemental machine learning model may be generated based on contents of a portion of a file, a signature of a file, and a source of a file, whereas a second supplemental machine learning model may be generated based on a signature of a file and a source of a file. Selection module 108 may therefore select a supplemental machine learning model from supplemental models 124 based on an attribute or set of attributes included in the supplemental machine learning model.

By selecting a continuation set of machine learning models to augment a base machine learning model, the systems and methods described herein may optimize usage of computing resources available to machine learning systems, as well as provide unique machine learning models for a variety of machine learning systems.

Figure 5:
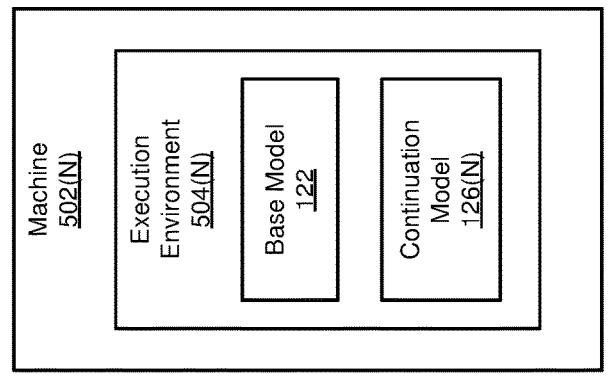
FIG. 5 is a block diagram of an example plurality of machines (e.g., machine learning systems) with a variety of execution environments, each machine configured to execute a base machine learning model (e.g., a base forest) and individualized continuation machine learning models (e.g., sets of continuation trees selected based on contextual factors associated with each execution environment) in accordance with principles described herein.
Figure 5:
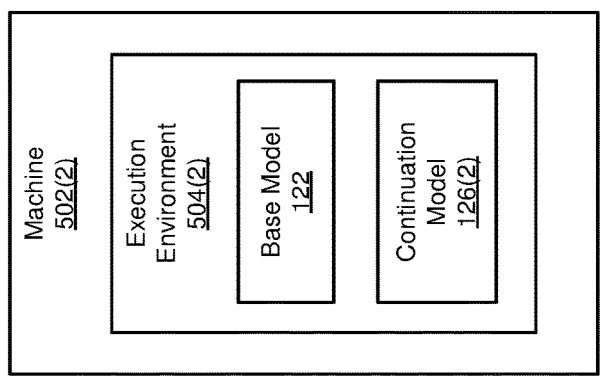
Figure 5:
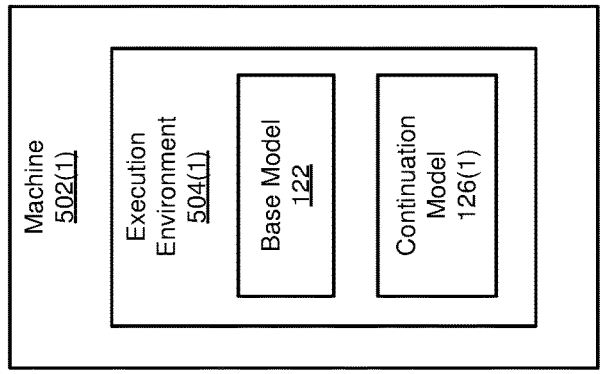

By way of illustration, FIG. 5 shows an example block diagram 500 of a plurality of machine learning systems, each with a unique execution environment and configured to make predictions regarding input data using a base machine learning model (e.g., a base forest) and an individualized continuation machine learning model (e.g., sets of continuation trees selected based on contextual factors associated with each execution environment). As shown, diagram 500 includes a set of machines 502 (e.g., machine 502(1), machine 502(2), and machine 502-(N)). Although three machines are shown in diagram 500, diagram 500 may represent any suitable number of machines 502.

Each machine 502 includes an execution environment 504 (e.g., execution environment 504(1), execution environment 504(2), and execution environment 504(N)). Each execution environment 504 may be unique in relation to the other execution environments, in that each execution environment 504 may be associated one or more unique contextual factors.

As further shown in diagram 500, each execution environment 504 includes base model 122, as well as a respective continuation model 126 (e.g., continuation model 126 (1), continuation model 126(2) and continuation model 126(N)). This may indicate that each machine 502 may be configured to make predictions regarding a set of input data using base model 122, and selection module 108 may have selected a unique continuation model 126 for each machine 502 based on one or more of the unique contextual factors associated with a respective execution environment 504. As described in greater detail below, one or more embodiments of the systems and methods described herein (e.g., direction module 110) may then direct each of machines 502 to utilize both base model 122 and the respective continuation model 126 when making predictions regarding a set of input data.

Returning to FIG. 3, at step 308, one or more of the systems described herein may direct a machine learning system to utilize both a base machine learning model and a continuation set of machine learning models when making predictions regarding a set of input data. For example, direction module 110 may, as part of computing device 202 and/or server 206, direct server 206 to utilize both base model 122 and continuation model 126 when making predictions regarding input data 212.

Direction module 110 may direct server 206 to utilize both base model 122 and continuation model 126 when making predictions regarding input data 212 in a variety of contexts. For example, in at least one embodiment, direction module 110 may direct server 206 to utilize both base model 122 and continuation model 126 when making predictions regarding input data 212 in accordance with any suitable ensemble machine learning method. As used herein, an "ensemble machine learning method" or "ensemble method" may be any technique, process, method, or formula that may be used to combine machine learning models when making predictions regarding a set of input data. Examples of ensemble methods may include, without limitation, voting, averaging, stacking, bootstrap aggregating (e.g., "bagging"), and boosting.

For example, base model 122 may include a random forest that may include at least one decision tree. A machine learning system that utilizes such a machine learning model may make predictions regarding input data by averaging predictions of all of the decision trees included in the random forest. As mentioned above, continuation model 126 may include at least one additional decision tree. Therefore, in some examples, direction module 110 may direct server 206 to utilize both base model 122 and continuation model 126 when making predictions regarding input data 212 by including the additional decision tree in the random forest when making predictions regarding input data 212. This may include including a prediction from the additional decision tree when averaging predictions from the decision trees included in base model 122.

By directing a machine learning system to utilize both a base machine learning model and a continuation set of machine learning models when making predictions regarding a set of input data, the systems and methods described herein may augment the base machine learning model with the continuation set of machine learning models. This may improve predictions regarding input data in accordance with performance capabilities of the machine learning system, as well as prevent malicious developers from tailoring malware to machine learning models utilized by particular execution environments.

In some embodiments, one or more of the systems described herein may predict, using a machine learning system, that malware is present on a source computing device. For example, one or more of modules 102 (e.g., generation module 104, determination module 106, etc.) may, as part of computing device 202 and/or server 206, predict, using server 206, that malware is present on computing device 202, server 206, and/or any other computing device. As used herein, a "source computing device" may include any computing device that stores, processes, accesses, transmits, and/or communicates a set of input data (e.g., input data 212) to a machine learning system (e.g., server 206). Source computing devices may include, without limitation, computing device 202, server 206, and/or any other computing device associated with, serviced by, in communication with, and/or protected by computing device 202 and/or server 206.

One or more of modules 102 (e.g., generation module 104, determination module 106, etc.) may predict, using server 206, that malware is present on a source computing device in a variety of contexts. For example, as described above, in some embodiments, server 206 may be configured to utilize both base model 122 and continuation model 126 to make predictions regarding whether data (e.g., input data 212) corresponds to malware properties, and input data 212 may include data that corresponds to malware properties. In such examples, base model 122 and continuation model 126 may be generated based on a set of training data that may include malware properties, and hence base model 122 and continuation model 126 may be configured to predict whether data (e.g., input data 212) may include malware properties and/or is associated with malware present on a source computing device.

As used herein, a "malware property" may include any quantitative or categorical feature, attribute, property, or variable that may identify data as malware and/or as associated with malware. Some malware properties may include, without limitation, a hash of a file, a calculated entropy score associated with a file, contents of at least a portion of a file, a signature of a file, a source of a file, file operations associated with a file, communications between computing devices associated with a file, and so forth.

As noted above, in some examples, input data 212 may include data that corresponds to malware properties and/or may be associated with data present on (e.g., stored by, accessible by, visible to, etc.) a source computing device. Server 206 may therefore analyze input data 212 using both base model 122 and continuation model 126, and generate a prediction (e.g., prediction 214) that may indicate (e.g., in accordance with a predetermined confidence threshold, such as 50 percent, 60 percent, 70 percent, 80 percent, 90 percent, etc.) whether input data 212 includes and/or is associated with malware present on a source computing device. Hence, in this and other ways, the systems and methods described herein may predict, using a machine learning system, that malware is present on a source computing device.

For example, server 206 may be configured to analyze data associated with (e.g., stored by, accessible by, visible to, etc.) a source computing device to predict whether the data includes malware properties. Server 206 may receive the data associated with the source computing device as input data 212, and may utilize base model 122 and continuation model 126 to predict whether input data 212 corresponds to malware properties (e.g., to generate prediction 214). Utilizing base model 122 and continuation model 126, server 206 may generate prediction 214 that may indicate, with an 86 percent confidence, that input data 212 corresponds to malware properties. This confidence level may be greater than a predetermined confidence threshold of 80 percent, which may then cause one or more of modules 102 (e.g., generation module 104, determination module 106, etc.) to predict that malware is present on the source computing device.

In some examples, one or more of modules 102 (e.g., generation module 104, determination module 106, etc.) may perform a security action to protect a source computing device from malware predicted to be present on (e.g., stored by, accessible by, visible to, etc.) the source computing device. In at least one embodiment, one or more of modules 102 (e.g., generation module 104, determination module 106, etc.) may perform the security action in response to one or more of modules 102 (e.g., generation module 104, determination module 106, etc.) predicting that malware is present on the source computing device.

In some examples, the security action may include (1) notifying an administrator of the source computing device that malware may be present on the source computing device, (2) preventing a user from accessing the malware, (3) quarantining the malware within a secure storage location, (4) preventing the source computing device from transmitting the malware to another computing device, (5) shutting down the source computing device to prevent the source computing device from transmitting the malware to another computing device, or any other action to prevent malware from affecting the source computing device and/or any other computing device.

Hence, the systems and methods described herein may improve an ability of a computer security system (e.g., a malware prevention system, an anti-virus system, etc.) to predict the presence of malware and/or other potentially harmful software on one or more source computing devices.

As described throughout the instant disclosure, the disclosed systems and methods may provide one or more advantages over traditional malware detection systems. For example, directing a variety of machines to utilize a base machine learning model (e.g., a base random forest) may enable a vendor to provide a base level of malware detection to a wide variety of machines. Dynamically augmenting the base machine learning model with a continuation model (e.g., a continuation tree) selected based on an execution environment of the machine learning system (e.g., processing resources available to the system, memory resources available to the system, a machine type of the system, etc.) may tailor a machine learning model to a specific machine learning system, thereby maximizing the prediction and/or detection capabilities of that specific machine learning system. Additionally, as the continuation model may be selected dynamically based on individual machine learning system characteristics, this may prevent developers from engineering malware to evade detection by any particular machine learning system and/or machine learning model.

Figure 6:
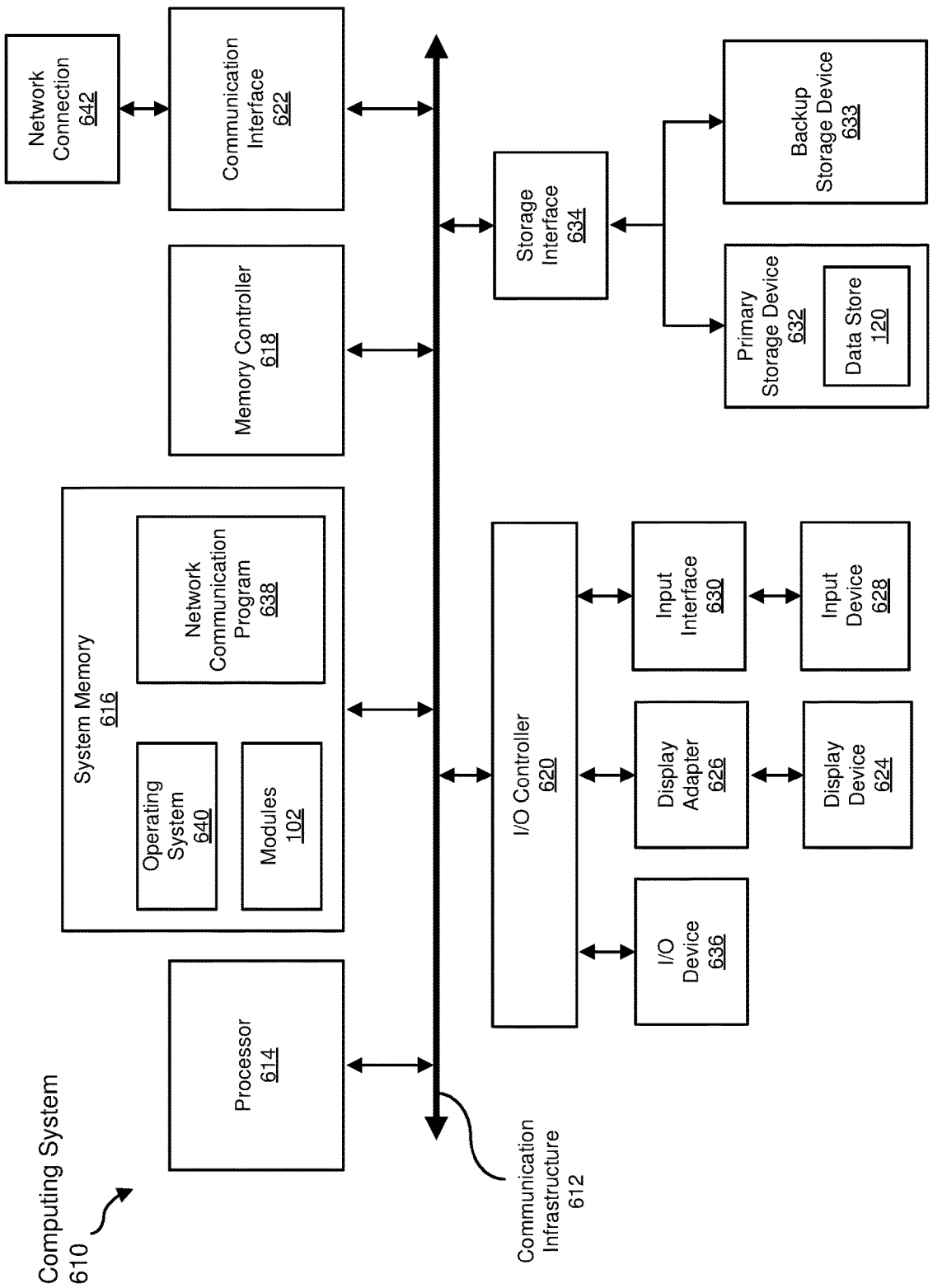
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data store 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
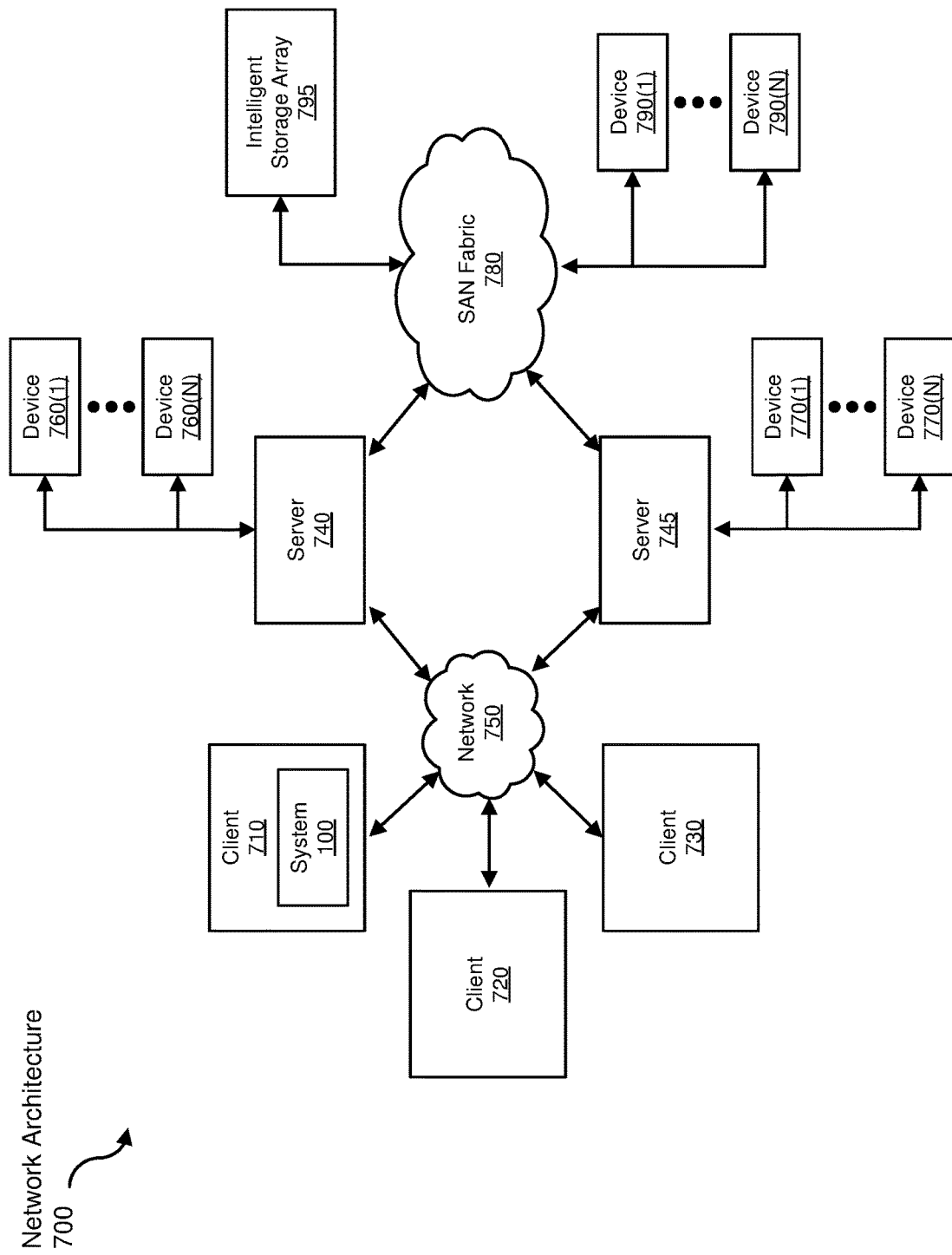
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for dynamically augmenting machine learning models based on contextual factors associated with execution environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive training data to be transformed, transform the training data, output a result of the transformation to generate a base machine learning model and a set of supplemental machine learning models, use the result of the transformation (e.g., the base machine learning model and a selected continuation set of machine learning models) to make predictions regarding a set of input data, and store the result of the transformation to direct other machine learning systems to utilize the generated base machine learning model and one or more of the supplemental machine learning models to make predictions regarding input data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically augmenting machine learning models based on contextual factors associated with execution environments, at least a portion of the method being performed by a computing device comprising at least one processor, the computer-implemented method comprising:
    generating a base machine learning model and a set of supplemental machine learning models;
    determining at least one contextual factor associated with an execution environment of a machine learning system that is configured to make predictions regarding a set of input data using at least the base machine learning model;
    selecting, based on the contextual factor associated with the execution environment of the machine learning system, a continuation set of machine learning models from the set of supplemental machine learning models;
    directing the machine learning system to utilize both the base machine learning model and the continuation set of machine learning models when making the predictions regarding the set of input data; and
    predicting, using the machine learning system, that malware is present on a source computing device.

2. The computer-implemented method of claim 1, wherein the contextual factor associated with the execution environment of the machine learning system comprises at least one of:
    a performance profile associated with the execution environment;
    processing resources of the execution environment;
    memory resources of the execution environment;
    bandwidth resources of the execution environment;
    a machine type associated with the execution environment;
    a hardware designator associated with the execution environment; and
    a software environment of the execution environment.

3. The computer-implemented method of claim 1, wherein:
    the base machine learning model comprises a random forest comprising at least one decision tree; and
    the continuation set of machine learning models comprises at least one additional decision tree.

4. The computer-implemented method of claim 3, wherein directing the machine learning system to utilize both the base machine learning model and the continuation set of machine learning models when making the predictions regarding the set of input data comprises including the additional decision tree in the random forest when making the predictions regarding the set of input data.

5. The computer-implemented method of claim 1, wherein selecting the continuation set of machine learning models comprises determining, based on the contextual factor, that the machine learning system is capable of making the predictions regarding input data within a threshold period of time while utilizing both the base machine learning model and the continuation set of machine learning models.

6. The computer-implemented method of claim 1, wherein selecting the continuation set of machine learning models comprises:
    identifying a prediction improvement factor associated with a machine learning model included in the set of supplemental machine learning models;
    determining that the prediction improvement factor associated with the machine learning model is greater than a predetermined prediction improvement threshold; and
    including the machine learning model in the continuation set of machine learning models.

7. The computer-implemented method of claim 1, wherein selecting the continuation set of machine learning models comprises:
    selecting at least one decision tree from a set of decision trees included in the set of supplemental machine learning models; and
    designating the decision tree as at least part of the continuation set of machine learning models.

8. The computer-implemented method of claim 1, wherein generating the base machine learning model and the set of supplemental machine learning models comprises:
    identifying a base set of attributes included in a set of training data and a supplemental set of attributes included in the set of training data;
    generating the base machine learning model based on the base set of attributes included in the set of training data;

generating at least one supplemental machine learning model based on the supplemental set of attributes included in the set of training data; and including the supplemental machine learning model in the set of supplemental machine learning models.

9. The computer-implemented method of claim 8, wherein:

generating the base machine learning model comprises generating a random forest based on the set of training data and the base set of attributes;

generating the supplemental machine learning model comprises:

generating a supplemental decision tree based on the set of training data and at least one attribute included in the supplemental set of attributes; and including the supplemental decision tree in the supplemental machine learning model;

selecting the continuation set of machine learning models from the set of supplemental machine learning models comprises selecting the supplemental machine learning model; and directing the machine learning system to utilize both the base machine learning model and the continuation set of machine learning models when making the predictions regarding the set of input data comprises including the supplemental decision tree in the random forest when making the predictions regarding the set of input data.

10. The computer-implemented method of claim 1, wherein:

the machine learning system is further configured to utilize both the base machine learning model and the continuation set of machine learning models to make predictions regarding whether data corresponds to malware properties; and the set of input data corresponds to the malware properties.

11. The computer-implemented method of claim 1, further comprising performing a security action to protect the source computing device from the malware predicted to be present on the source computing device.

12. The computer-implemented method of claim 11, wherein the security action comprises at least one of:

notifying an administrator of the source computing device that the malware may be present on the source computing device;

preventing a user from accessing the malware;

quarantining the malware within a secure storage location;

preventing the source computing device from transmitting the malware to another computing device; and preventing the source computing device from transmitting the malware to the another computing device by shutting down the source computing device.

13. A system for dynamically augmenting machine learning models based on contextual factors associated with execution environments, the system comprising:

a generation module, stored in memory, that generates a base machine learning model and a set of supplemental machine learning models;

a determination module, stored in memory, that determines at least one contextual factor associated with an execution environment of a machine learning system that is configured to make predictions regarding a set of input data using at least the base machine learning model;

a selection module, stored in memory, that selects, based on the contextual factor associated with the execution environment of the machine learning system, a continuation set of machine learning models from the set of supplemental machine learning models;

a direction module, stored in memory, that directs the machine learning system to utilize both the base machine learning model and the continuation set of machine learning models when making the predictions regarding the set of input data, wherein the machine learning system predicts that malware is present on a source computing device; and at least one physical processor that executes the generation module, the determination module, the selection module, and the direction module.

14. The system of claim 13, wherein the contextual factor associated with the execution environment of the machine learning system comprises at least one of:

a performance profile associated with the execution environment;

processing resources of the execution environment;

memory resources of the execution environment;

bandwidth resources of the execution environment;

a machine type associated with the execution environment;

a hardware designator associated with the execution environment; and a software environment of the execution environment.

15. The system of claim 13, wherein:

the base machine learning model comprises a random forest comprising at least one decision tree;

the continuation set of machine learning models comprises at least one additional decision tree; and the direction module directs the machine learning system to utilize both the base machine learning model and the continuation set of machine learning models when making the predictions regarding the set of input data by including the additional decision tree in the random forest when making the predictions regarding the set of input data.

16. The system of claim 13, wherein the selection module selects the continuation set of machine learning models by determining, based on the contextual factor, that the machine learning system is capable of making the predictions regarding input data within a threshold period of time while utilizing both the base machine learning model and the continuation set of machine learning models.

17. The system of claim 13, wherein the selection module selects the continuation set of machine learning models by:

selecting at least one decision tree from a set of decision trees included in the set of supplemental machine learning models; and designating the decision tree as at least part of the continuation set of machine learning models.

18. The system of claim 13, wherein:

the machine learning system is further configured to utilize both the base machine learning model and the continuation set of machine learning models to make predictions regarding whether data corresponds to malware properties; and the set of input data corresponds to the malware properties.

19. A non-transitory computer-readable medium comprising one or more computer-executable instructions that, when executed by at least one processor of a computing device, cause the computing device to:

generate a base machine learning model and a supplemental set of machine learning models;

determine at least one contextual factor associated with an execution environment of a machine learning system that is configured to make predictions regarding a set of input data using at least the base machine learning model;

select, based on the contextual factor associated with the execution environment of the machine learning system, a continuation set of machine learning models from the supplemental set of machine learning models;

direct the machine learning system to utilize both the base machine learning model and the continuation set of machine learning models when making the predictions regarding the set of input data; and predict, using the machine learning system, that malware is present on a source computing device.

20. The medium of claim 19, wherein the contextual factor associated with the execution environment of the machine learning system comprises at least one of:

a performance profile associated with the execution environment;

processing resources of the execution environment;

memory resources of the execution environment;

bandwidth resources of the execution environment;

a machine type associated with the execution environment;

a hardware designator associated with the execution environment; and a software environment of the execution environment.

* * * * *